(12) United States Patent
Raitola

(10) Patent No.: US 7,336,629 B1
(45) Date of Patent: Feb. 26, 2008

(54) POWER CONTROL METHOD AND DEVICE

(75) Inventor: Mika Raitola, Masala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/018,584

(22) PCT Filed: Jun. 29, 1999

(86) PCT No.: PCT/EP99/04495

§ 371 (c)(1),
(2), (4) Date: Feb. 4, 2002

(87) PCT Pub. No.: WO01/03328

PCT Pub. Date: Jan. 11, 2001

(51) Int. Cl.
*G08C 17/00* (2006.01)

(52) U.S. Cl. .................................. 370/311; 455/522

(58) Field of Classification Search ............. 370/277, 370/310, 318, 331, 332, 310–11; 455/69, 455/432, 436, 444, 522
See application file for complete search history.

(56) References Cited

U.S. PATENT DOCUMENTS

| | | | |
|---|---|---|---|
| 5,768,684 A * | 6/1998 | Grubb et al. ............... | 455/13.4 |
| 6,002,942 A | 12/1999 | Park .......................... | 455/522 |
| 6,064,659 A * | 5/2000 | Rohani et al. .............. | 370/318 |
| 6,311,070 B1 * | 10/2001 | Tong et al. ................. | 455/522 |
| 6,337,988 B1 * | 1/2002 | Agin et al. ................. | 455/522 |
| 6,603,980 B1 * | 8/2003 | Kitagawa et al. ........... | 455/522 |
| 6,697,635 B2 * | 2/2004 | Bae ............................ | 455/522 |
| 6,765,883 B1 * | 7/2004 | van Heeswyk ............. | 370/318 |
| 6,804,531 B2 * | 10/2004 | Komatsu .................... | 455/522 |
| 6,856,644 B1 * | 2/2005 | Wang et al. ................ | 375/130 |
| 7,027,810 B2 * | 4/2006 | Shirai ........................ | 455/423 |

FOREIGN PATENT DOCUMENTS

| | | |
|---|---|---|
| EP | 0 682 417 | 11/1995 |
| EP | 0 682 419 A2 | 11/1995 |
| JP | 10 -066139 | 3/1998 |

\* cited by examiner

*Primary Examiner*—Wing Chan
*Assistant Examiner*—Mark A. Mais
(74) *Attorney, Agent, or Firm*—Harrington & Smith, PC

(57) ABSTRACT

A method and device for controlling a power used for transmitting data between a terminal device and a transceiver device, wherein the method comprises monitoring during predetermined time units the power used in a transmission between the terminal device and the transceiver device, requesting an increase or a decrease of the power used in the transmission, storing a predetermined number of specific information elements of subsequent time units, calculating a power raise requested for the power, calculating an average received power during a plurality of subsequent time units and determining whether the calculated power raise is greater than a sum of the calculated average power of transmission and a predetermined level. If the determination is positive, the increase of the power is prohibited even if an increase is requested. If the determination is negative, an increase of the power used in the transmission is allowed when an increase is requested.

34 Claims, 2 Drawing Sheets

POWER CONTROL METHOD AND DEVICE

PRIORITY CLAIM

This is a national stage of PCT application No. PCT/EP99/04495, filed on Jun. 29, 1999.

FIELD OF THE INVENTION

The present invention relates to a method for controlling a power used for transmitting data between a terminal device and a transceiver device of a communication system and also to a corresponding device. In particular, the present invention is directed to a power control method and corresponding device used in Code Division Multiple Access (CDMA) systems.

BACKGROUND OF THE INVENTION

In recent years, mobile radio telecommunication systems have widely spread. Such mobile radio telecommunication systems (for example GSM, $3^{rd}$ generation system such as the Universal Mobile Telecommunications System (UMTS) and others) operate with different data transmission methods. Such a data transmission method is for example a Code Division Multiple Access (CDMA) method. Said CDMA method is further developed into a Wideband Code Division Multiple Access (WCDMA) method (or Broadband CDMA) using a greater frequency band for example to be used in $3^{rd}$ generation communication systems like the UMTS.

In both CDMA and WCDMA methods, the basic operating principle is similar. Data to be transmitted between terminal devices such as mobile stations via a communication network comprising several network elements such as transceiver devices such as base transceiver stations, mobile switching centers and the like is multiplied with a unique code allocated to each connection. Said code has a higher frequency than the data which results in a wide transmission bandwidth in comparison with the original data bandwidth. This process is also known as spreading.

On a receiving side knowing the respective code, the transmitted signal is decoded and the recovered data is processed further. This process is also known as despreading.

For a correct recovery of the data from the transmitted signal a major condition is that the received signals have a (nearly) constant and equal strength. Since in a mobile telecommunication system, for example due to a movement of the terminal devices, widely different signal strengths may be received when transmitting always with the same transmission power, interference between different terminal devices transmitting at the same time may occur. Therefore, an accurate power control in uplink (terminal device to transceiver station) and downlink (transceiver station to terminal device) is required.

In third generation CDMA systems (e.g. cdma2000, WCDMA) fast power control is used both in uplink and downlink. Here, the decoding performance is optimal when the received signal power is as constant as possible. This is required especially when the service delay is limited (for example in speech communication) and a fading may cause errors. The fast power control is able to follow even fast fadings.

On the other hand, the downlink transmission capacity is maximized when the transmitted power is minimized, i.e. the generated interference is as low as possible. However, fast power control aims that the received power is constant. This means that the transmitted power varies greatly, which increases the transmitted power average. Also, the variation of transmitted power causes power spikes which are harmful for system load control.

However, in case of e.g. a packet data service, a retransmission protocol is included. This means that a loss of data, for example due to decoding problems, would not cause absolute errors but only lead to a retransmission. This allows a packet data power control not to follow every fade, but to compensate fades by retransmissions.

When using a slower power control occurrence of high interference spikes as in the fast power control can be prevented. However, slower power control works poorly for delay limited services as it can not follow fast fading of the signal.

In document EP-A-0 682 417, a transmission power control method of a spread spectrum communication system is disclosed which determines transmission power in accordance with a transmission power control (TPC) bit.

In document EP-A-0 682 419, a transmission power control method is disclosed which uses an open or a closed loop control in dependence on changes in the desired received signal level at the mobile station.

SUMMARY OF THE INVENTION

Consequently, it is an object of the present invention to provide an improved method and a corresponding device for controlling a power used for transmitting data between a terminal device and a transceiver device of a communication system.

According to the present invention, this object is achieved by a method for controlling a power used for transmitting data between a terminal device and a transceiver device of a communication system, said method comprising the steps of monitoring during a predetermined time unit the power used in a transmission between said terminal device and said transceiver device, requesting an increase or a decrease of the power used in the transmission by using a specific information element for each predetermined time unit, storing a predetermined number of said specific information elements, calculating a first value and a second value concerning the power of transmission during said predetermined number of said specific information elements, and deciding by using the first value and the second value concerning the power calculated in said calculating step, whether the first value concerning the power is greater than a sum of the second value concerning the power and a predetermined level.

Furthermore, the present invention proposes a device for controlling a power used for transmitting data between a terminal device and a transceiver device of a communication system, said device comprising monitoring means for monitoring during a predetermined time unit the power used in a transmission between said terminal device and said transceiver device, requesting means for requesting an increase or a decrease of the power used in the transmission by using a specific information element for each predetermined time unit, storing means for storing a predetermined number of said specific information elements, calculating means for calculating a first value and a second value concerning the power of transmission during said predetermined number of said specific information elements, and deciding means for deciding by using the first value and the second value concerning the power calculated by said calculating means, whether the first value concerning the power is greater than a sum of the second value concerning the power and a predetermined level.

Advantageous further developments of the present invention are as set out in the respective dependent claims.

According to the present invention, the proposed method and/or device are easy to implement since only small changes to present systems are necessary.

Furthermore, for example a downlink power control according to the present invention is able to maximize the decoding performance by following fading as well as possible and also to minimize the interference caused to the other terminal devices. It is possible to follow even fast fading as in the fast power control, but if the requested power raise within a predetermined time is to high a corresponding high increase of the transmission power is prevented. Moreover, excessively high power spikes are inhibited and therefore the performance of the system load control can be improved.

Preferred embodiments of the invention are described herein below in detail by way of example with reference to the accompanying drawings.

DESCRIPTION OF PREFERRED EMBODIMENTS

In the following, as a first example, the above mentioned downlink case is described.

Figure 1:
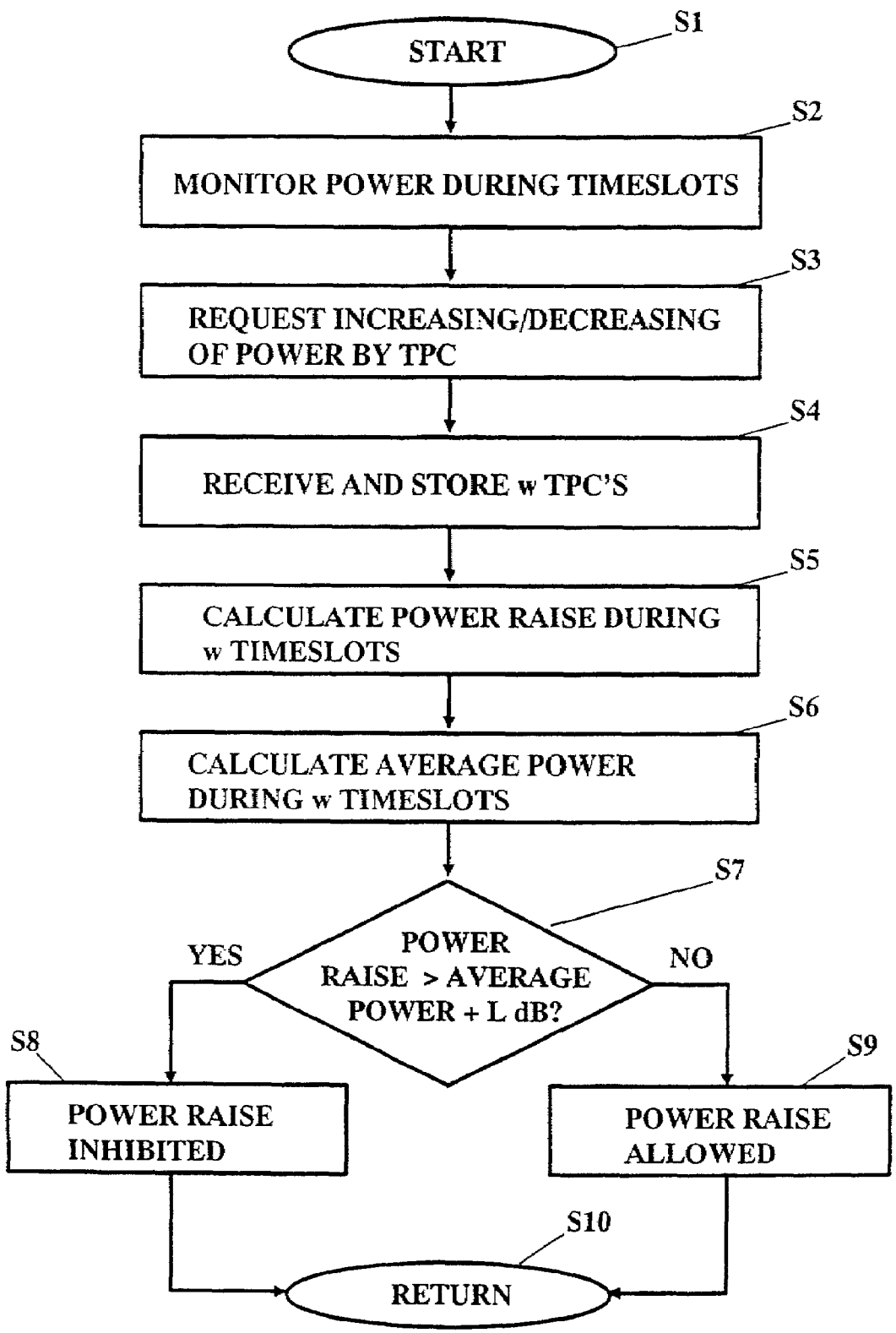
FIG. 1 shows a flowchart illustrating the method according to the present invention.

With reference to FIG. 1, a power control method according to the present invention is illustrated in the flowchart.

In step S1, the power control is started, for example when a packet data communication connection is established between two terminal devices TD via a communication network (i.e. via at least one base transceiver station BTS). During the communication, the signal strength (i.e. the transmission power) from the base transceiver station BTS is frequently monitored in each timeslot by the terminal device TD (step S2). If necessary, i.e. when the signal strength changes above or below a predetermined value, in step S3, the terminal device TD requests an increase or decrease of the transmission power of the base transceiver station, respectively.

This request is represented by specific information elements or commands which are known as so-called transfer power control bits TPC. Said TPC bits have a value of +1 if an increase of power by a predetermined level is requested and a value of −1 if a decrease of power by a predetermined level is requested. For each time unit, one TPC bit is sent. Said time unit is for example one timeslot or a frame consisting of a plurality of timeslots.

In step S4, the base transceiver station BTS receives said TPC bits sent for each time unit. Furthermore, a predetermined number w of said TPC bits, i.e. TPC bits of a predetermined number w of subsequent time units are stored. When reaching the predetermined number w, in step S5, a power raise during the recent w time units is calculated. This power raise can be determined for example by summing the TPC bits. Then, in step S6, also an received average power of transmission (e.g. indicated in dB) is calculated during said w time units by using the TPC bits. The calculation of the average power can be performed, for example, as follows: In the beginning of a calculation period, the power (i.e. the signal strength) has an value of e.g. 10 dBm. When in the calculation period TPC bits −1, +1, +1, +1 are sent, the average power is calculated by $$\text{average power} = ((10-1)+(10-1+1)+(10-1+1)+(10-1+1+1))/4 = 42/4 \; [\text{dBm}].$$

In step S7, it is decided by using said calculated power raise and average power of transmission during the w time units, whether the power raise is higher than a sum of the average power and a predetermined level L. Said predetermined level L is given for example in dB.

If the decision in step S7 is positive, i.e. the power raise for said w time units is at least L dB higher than the average power, a increase of the transmission power is inhibited (step S8). That means, the transmission power used by the base transceiver station BTS to the terminal device TD is kept constant or is even decreased, even if an increase was requested.

On the other hand, if the decision in step S7 is negative, i.e. the power raise during said w time units is not L dB higher than the average power, a power raise is allowed, i.e. the transmission power can be increased (or decreased) by the base transceiver station (step S9) as requested. The transmission power sent by the base transceiver station is increased (or decreased) according to the sum of all TPC bits received during all w time units (e.g. +3). Optionally, the transmission power may only be increased (or decreased) according to the most recent requested power raise (i.e. only the last received TPC bit, for example +1, is taken into account). The decision, in which way of the above described cases the power is changed, may be depending on the respective application.

In step S10, the power control method is restarted.

Figure 2:
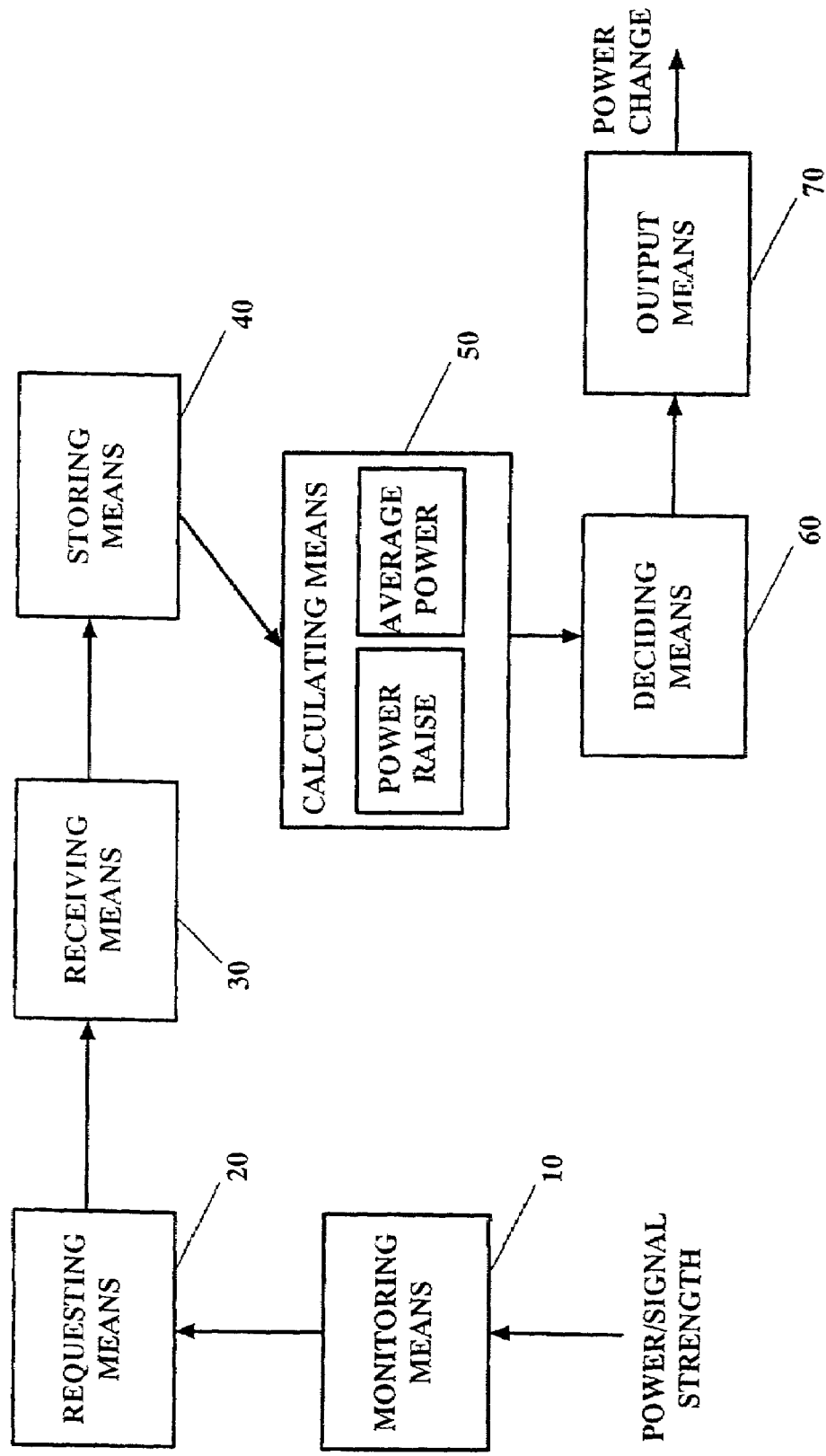
FIG. 2 shows a block circuit diagram illustrating an embodiment of the device according to the present invention.

With reference to FIG. 2, a device adapted to perform a power control method according to the present invention is described below.

When the communication between terminal devices TD via at least one base transceiver station BTS (and probably other network elements) starts, the received signal strength (i.e. the transmission power used for the communication) is monitored frequently and periodically at each time unit by a monitoring means 10. A requesting means 20 requests an increase or a decrease of the transmission power used by the base transceiver station BTS depending on results of said monitoring means 10. For this purpose a TPC bit having a value of +1 or −1 is sent each timeslot as command data from the terminal device TD to the base transceiver station BTS.

Said TPC bits are received by a receiving means 30, for example at the base transceiver station, to be stored in a storing means 40. Said storing means 40 is adapted to store at least a predetermined number w of TPC bits (TPC bits of w time units or timeslots). When the predetermined number w of TPC bits is reached, a calculating means 50 calculates the power raise and the average power using the stored TPC bits during said w time units as described above.

In a deciding means 60 it is decided whether the calculated power raise is greater than the sum of the average power and the predetermined level L.

Depending on the result of said deciding means 60 an output means 70 outputs a power change signal which inhibit a transmission power change by the base transceiver station BTS in the case that the power raise is at least L dB higher than the average power. On the other hand, in the case that the power raise is not L dB higher than the average power, a power change signal is output to allow a increase (or decrease) of power by the base transceiver station BTS as requested.

A proposal for parameters w and L are w=16 . . . 64 and L=1 dB . . . 3 dB. However, other parameter values can be used depending on for example user specific or connection type specific specifications.

By using the above described downlink power control it is possible to reach of several dB in comparison to the conventional power control. The reached gain depends also on the connection type, e.g. outdoor to indoor channel, single path channel etc. In case that there are only few multipaths, the gain is the highest. It is possible to reach a 20% gain in capacity in comparison to the previous known methods in the system level.

As a second embodiment, the above described method and device can also be used in uplink direction, i.e. in power control for signaling from the terminal device TD to the base transceiver station BTS. In this case, the signal strength from the terminal device TD is monitored by the base transceiver station. The further steps of storing, calculating, comparing/deciding and outputting (steps S4 to S9) and the corresponding means 30 to 70 may then be implemented also in the base transceiver station BTS or in the terminal device TD. In case of the uplink power control, the method for example is based on received signal to interference ratio (SIR) values which represent the difference between a "wanted" signal and an interfering signal.

It is to be noted that the present invention can be implemented as hardware and/or software in the terminal device and/or the base transceiver station. The present invention can be used preferably in WCDMA systems during a packet data communication, but also in any other CDMA system (for example IS-95, cdma2000 etc.) during any data communication (speech, packet data and the like).

Furthermore, the calculation (and therefore the decision whether to allow or to prevent a power raise) can be done timeslot per timeslot. Alternatively, it is also possible to use more timeslots or time units (i.e. TPC bits) for the calculation of the power raise and the average power.

The present invention proposes a method for controlling a power used for transmitting data between a terminal device TD and a transceiver device BTS of a communication system, said method comprising the steps of monitoring S2 during a predetermined time unit the power used in a transmission between said terminal device TD and said transceiver device BTS, requesting S3 an increase or a decrease of the power used in the transmission by using a specific information element TPC for each predetermined time unit, storing S4 a predetermined number w of said specific information elements TPC, calculating S5, S6 a first value and a second value concerning the power of transmission during said predetermined number w of said specific information elements TPC, and deciding S7 by using the first value and the second value concerning the power calculated in said calculating step S5, S6, whether the first value concerning the power is greater than a sum of the second value concerning the power and a predetermined level L. The present invention also proposes a corresponding device.

It should be understood that the above description and accompanying figures are merely intended to illustrate the present invention by way of example only. The preferred embodiments of the present invention may thus vary within the scope of the attached claims.

What is claimed is:

1. A method comprising:
    controlling a power used for transmitting data between a terminal device and a transceiver device of a communication system;
    monitoring during each of predetermined time units the power used in a transmission between said terminal device and said transceiver device;
    requesting an increase or a decrease of the power used in the transmission by using a specific information element for each of the predetermined time units, the specific information element having either a positive value for increasing power or a negative value for decreasing power;
    storing, during a predetermined period comprising a plurality of subsequent time units, a plurality of the values of the specific information elements;
    calculating a power raise requested for the power used in the transmission by summing the stored values of the plurality of specific information elements;
    calculating an average received power of transmission during the predetermined period comprising the plurality of subsequent time units by using the stored values of the specific information elements;
    determining whether or not the calculated power raise is greater than a sum of the calculated average power of transmission and a predetermined level; and
        if the determination is positive, inhibiting an increase of the power used in the transmission even if an increase is requested, and
        if the determination is negative, allowing an increase of the power used in the transmission when an increase is requested.

2. The method of claim 1, wherein said predetermined time unit is a timeslot.

3. The method of claim 1, wherein said predetermined time unit is a frame composed of a plurality of timeslots.

4. The method of claim 1, wherein a value of each one of said specific information elements used in each predetermined time unit is one of −1 indicating a request for a decrease of power and +1 indicating a request for an increase of power.

5. The method of claim 1, wherein said method is performed by at least one of said terminal device and said transceiver device.

6. The method of claim 1, wherein said method is performed in a downlink direction.

7. The method of claim 1, wherein said method is performed in an uplink direction.

8. A device comprising:
    controlling means for controlling a power used for transmitting data between a terminal device and a transceiver device of a communication system;
    monitoring means for monitoring during each of predetermined time units the power used in a transmission between said terminal device and said transceiver device;
    requesting means for requesting an increase or a decrease of the power used in the transmission by using a specific information element for each of the predetermined time units, the specific information element having either a positive value for increasing power or a negative value for decreasing power;
    storing means for storing, during a predetermined period comprising a plurality of subsequent time units, a plurality of the values of the specific information elements;

calculating means for calculating a power raise requested for the power used in the transmission by summing the stored values of the plurality of the specific information elements;

calculating means for calculating an average received power of transmission during the predetermined period comprising the plurality of subsequent time units by using stored values of the specific information elements;

determining means for determining whether the calculated power raise is greater than a sum of the calculated average power of transmission and a predetermined level; and an output means for outputting a signal configured to one of inhibit an increase of the power used in the transmission even if an increase is requested if the determination is positive and allow an increase of the power used in the transmission when the increase is requested if the determination is negative.

9. The device of claim 8, wherein said predetermined time unit is a timeslot.

10. The device of claim 8, wherein said predetermined time unit is a frame composed of a plurality of timeslots.

11. The device of claim 8, wherein a value of each one of said specific information elements used in each predetermined time unit is one of −1 indicating a request for a decrease of power and +1 indicating a request for an increase of power.

12. The device of claim 8, wherein said device is included by at least one of said terminal device and said transceiver station.

13. The device of claim 8, wherein said device is configured to perform a power control in a downlink direction.

14. The device of claim 8, wherein said device is configured to perform a power control in an uplink direction.

15. The method of claim 2, wherein said method is performed by at least one of said terminal device and said transceiver station.

16. The method of claim 3, wherein said method is performed by at least one of said terminal device and said transceiver device.

17. The method of claim 4, wherein said method is performed by at least one of said terminal device and said transceiver device.

18. The method of claim 2, wherein said method is performed in a downlink direction.

19. The method of claim 3, wherein said method is performed in a downlink direction.

20. The method of claim 4, wherein said method is performed in a downlink direction.

21. The method of claim 2, wherein said method is performed in an uplink direction.

22. The method of claim 3, wherein said method is performed in an uplink direction.

23. The method of claim 4, wherein said method is performed in an uplink direction.

24. The device of claim 9, wherein said device is included by at least one of said terminal device and said transceiver device.

25. The device of claim 10, wherein said device is included by at least one of said terminal device and said transceiver device.

26. The device of claim 11, wherein said device is included by at least one of said terminal device and said transceiver device.

27. The device of claim 9, wherein said device is configured to perform a power control in a downlink direction.

28. The device of claim 10, wherein said device is configured to perform a power control in a downlink direction.

29. The device of claim 11, wherein said device is configured to perform a power control in a downlink direction.

30. The device of claim 9, wherein said device is configured to perform a power control in an uplink direction.

31. The device of claim 10, wherein said device is configured to perform a power control in an uplink direction.

32. The device of claim 11, wherein said device is configured to perform a power control in an uplink direction.

33. A base transceiver station comprising:

a control unit for controlling a power used for transmitting data between a terminal device of a communication system;

a monitoring unit for monitoring the power used in a transmission between said terminal device and said transceiver device during each of predetermined time units;

a request unit for requesting an increase or a decrease of the power used in the transmission by using a specific information element for each of the predetermined time units, the specific information element having either a positive value for increasing power or a negative value for decreasing power;

a storage unit for storing during a predetermined period comprising a plurality of subsequent time units, a plurality of the values of the specific information elements;

a first calculating unit for calculating a power raise requested for the power used in the transmission by summing the stored values of the plurality of the specific information elements;

a second calculating unit for calculating an average received power of transmission during the predetermined period comprising the plurality of subsequent time units by using stored values of the specific information elements;

a determining unit for determining whether the calculated power raise is greater than a sum of the calculated average power of transmission and a predetermined level; and an output unit for outputting a signal configured to one of inhibit an increase of the power used in the transmission even if an increase is requested if the determination is positive and allow an increase of the power used in the transmission when the increase is requested if the determination is negative.

34. A terminal device comprising:

a control unit for controlling a power used for transmitting data to a transceiver device of a communication system;

a monitoring unit for monitoring the power used in a transmission between said terminal device and said transceiver device during each of predetermined time units;

a request unit for requesting an increase or a decrease of the power used in the transmission by using a specific information element for each of the predetermined time units, the specific information element having either a positive value for increasing power or a negative value for decreasing power;

a storage unit for storing during a predetermined period comprising a plurality of subsequent time units, a plurality of the values of the specific information elements;

a first calculating unit for calculating a power raise requested for the power used in the transmission by summing the stored values of the plurality of the specific information elements;

a second calculating unit for calculating an average received power of transmission during the predetermined period comprising the plurality of subsequent time units by using stored values of the specific information elements;

a determining unit for determining whether the calculated power raise is greater than a sum of the calculated average power of transmission and a predetermined level; and an output unit for outputting a signal configured to one of inhibit an increase of the power used in the transmission even if an increase is requested if the determination is positive and allow an increase of the power used in the transmission when the increase is requested if the determination is negative.

* * * * *